United States Patent [19]

Citta et al.

[11] Patent Number: 5,107,348
[45] Date of Patent: Apr. 21, 1992

[54] TEMPORAL DECORRELATION OF BLOCK ARTIFACTS

[75] Inventors: Richard W. Citta, Oak Park; Stephen M. Dicke, Wheeling; Ronald B. Lee, Chicago, all of Ill.

[73] Assignee: Zenith Electronics Corporation, Glenview, Ill.

[21] Appl. No.: 551,696

[22] Filed: Jul. 11, 1990

[51] Int. Cl.⁵ .............................................. H04N 7/13
[52] U.S. Cl. ..................................... 358/136; 358/133
[58] Field of Search ................ 358/133, 136, 105, 167

[56] References Cited

U.S. PATENT DOCUMENTS

| | | | |
|---|---|---|---|
| 4,383,272 | 5/1983 | Netravali et al. | 358/105 X |
| 4,663,660 | 5/1987 | Fedele et al. | 358/136 |
| 4,707,738 | 11/1987 | Ferre et al. | 358/136 X |
| 4,890,160 | 12/1989 | Thomas | 358/136 X |
| 4,931,869 | 6/1990 | Amor et al. | 358/133 |
| 4,999,705 | 3/1991 | Puri | 358/136 |
| 5,008,748 | 4/1991 | Carr et al. | 358/136 |
| 5,019,901 | 5/1991 | Uomori et al. | 358/136 X |

Primary Examiner—Victor R. Kostak

[57] ABSTRACT

A video signal comprising a successive series of frames is sub-band coded to derive a plurality of groups of coefficients for each frame. Each group of coefficients comprises a spectral representation of the video content of a respective portion of the frame, which portions are spatially decorrelated relative to the corresponding portions of the immediately preceding and immediately following frames to reduce block artifacts in the reproduced image.

20 Claims, 9 Drawing Sheets

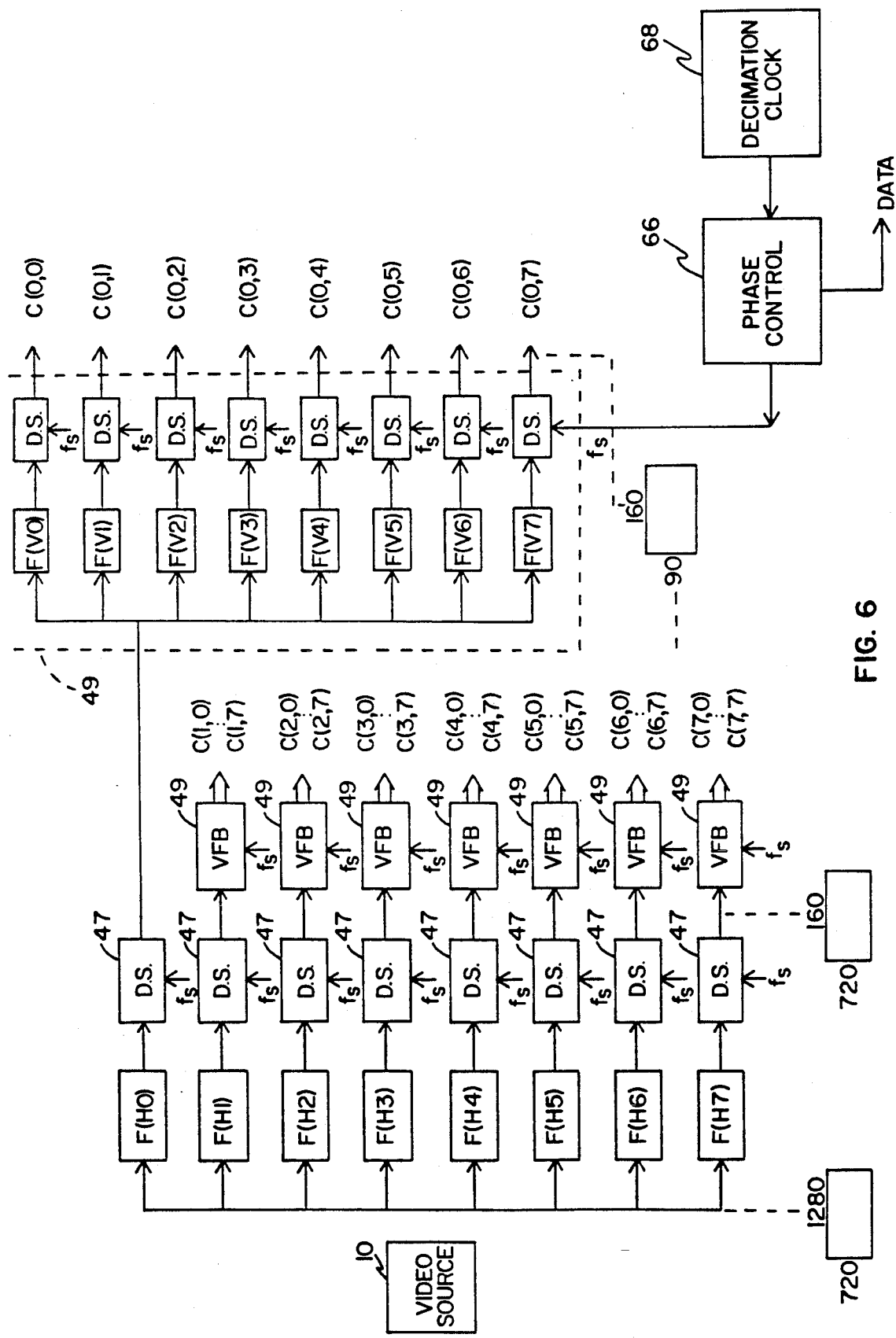

TEMPORAL DECORRELATION OF BLOCK ARTIFACTS

CROSS-REFERENCE TO RELATED APPLICATIONS

This application is related to copending application Ser. No. 539,770, filed Jun. 18, 1990, entitled Video Transmission System Using Adaptive Sub-band Coding and which is assigned to the assignee of the present application.

BACKGROUND OF THE INVENTION

The present invention relates to video transmission systems employing sub-band coding and particularly concerns methods and apparatus for reducing block artifacts in the reproduced video image of a system employing complementary sub-band coding and decoding operations.

Sub-band coding is a process which has been frequently proposed for compressing a wideband video signal for transmission through a channel of limited bandwidth, such as a standard 6 MHz television channel. Sub-band coding, as the term is used herein, refers generally to a process wherein a video image signal is converted into a plurality of spectral coefficients representative thereof and may be effected either by spatially filtering the video signal or by subjecting it to a suitable block transform, such as the discrete cosine transform (DCT). In either case, the video signal is separated into a plurality of sub-bands each comprising a series of coefficients with the coefficients derived for each sub-band representing a different spectral component of a respective block of the video image. The sub-band coefficients are subsequently processed in accordance with a data compression algorithm to allow for their transmission within the available bandwidth of the transmission channel. A system for variably quantizing or truncating the coefficients according to an adaptive algorithm is disclosed in the above copending application.

The received coefficients are processed by a complementary decoder to reconstruct a representation of the source video image. Due to the quantization or truncation of the coefficients before transmission, the reconstructed image may be characterized by block artifacts which create a visually perceptible blockiness in the reproduced image. Block artifacts are particularly pronounced along diagonal edges which cut through the block structure of the image. These edges are reproduced with relatively low resolution and actually assume a staircase shape rather than a straight line. This effect, along with other block artifacts, is very perceptible to the viewer and therefore quite undesirable.

OBJECTS OF THE INVENTION

It is therefore a basic object of the present invention to provide an improved sub-band coding system for video images.

It is another object of the invention to provide a sub-band coding system for video images in which artifacts in the reproduced image are substantially minimized.

It is a further object of the invention to provide a sub-band coding system in which block artifacts in the reproduced image are reduced by temporal decorrelation.

BRIEF DESCRIPTION OF THE DRAWINGS

These and other objects and advantages of the invention will be apparent upon reading the following description in conjunction with the drawings, in which:

FIG. 6 is a block diagram of a QMF bank constructed according to the invention;

DESCRIPTION OF THE PREFERRED EMBODIMENT

Figure 1:
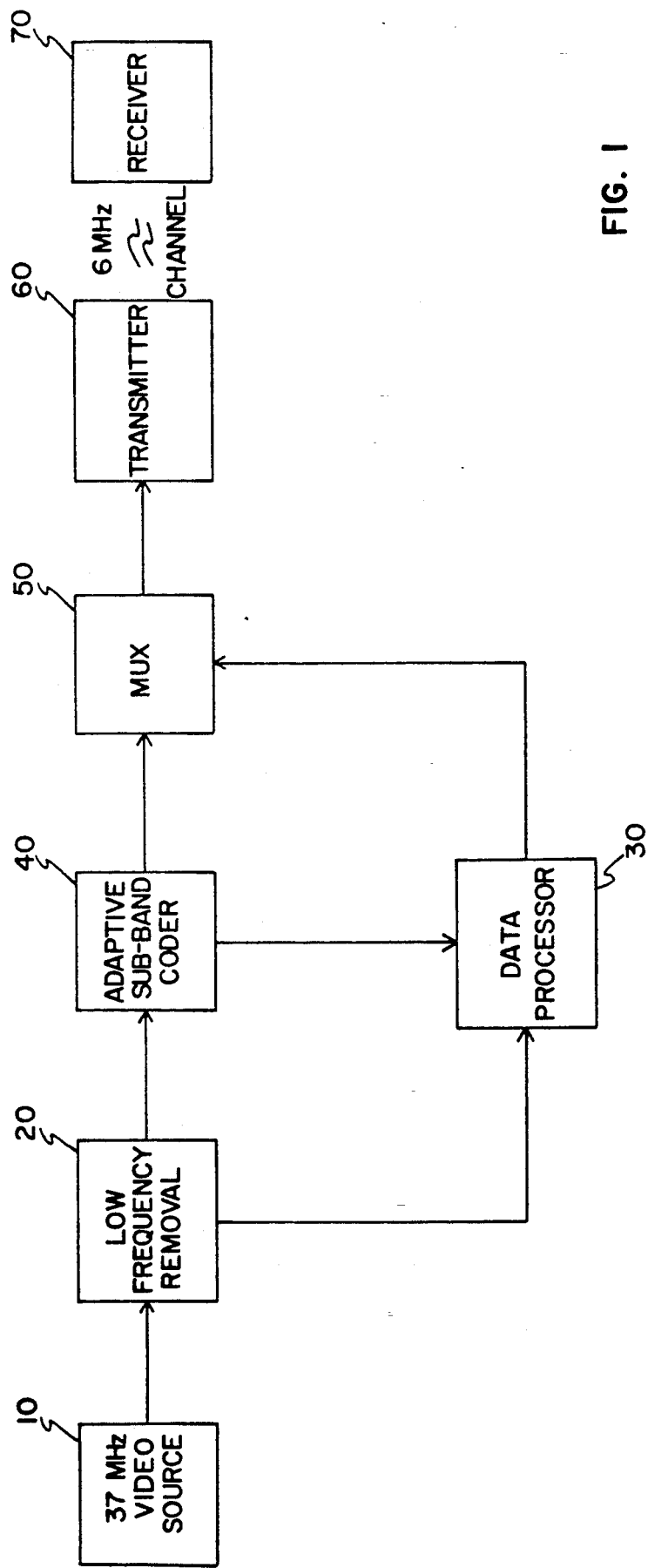
FIG. 1 is a block diagram of a video transmission system employing the techniques of the present invention.

FIG. 1 illustrates an exemplary video signal transmission system in which the sub-band coding techniques of the present invention may be employed. A video source 10 provides a video signal which may have a bandwidth of about 37 MHz. Although not necessarily limited thereto, source 10 preferably provides a progressively scanned video signal having a vertical periodicity equal to the NTSC standard and a horizontal periodicity equal to three times the NTSC standard. The video signal provided by source 10 may be applied to a low frequency removal circuit 20 of the type disclosed in copending application Ser. No. 238,956, filed Aug. 31, 1988. Low frequency removal circuit 20 extracts the low frequencies (typically the frequencies below about 1 MHz) from the video signal provided by source 10 and couples a digital representation thereof to a data processing circuit 30. Data processing circuit 30 is preferably an adaptive delta modulation processor of the type disclosed in copending application Ser. No. 453,525, filed Dec. 20, 1989.

The high frequency component of the video source signal is coupled from low frequency removal circuit 20 to an adaptive sub-band coder 40, which is the subject of the related copending application. As explained in the latter disclosure, sub-band coder 40 processes each frame of the applied video signal to provide 14,400 groups of spectral coefficients. Each group comprises 64 coefficients and represents the spectral components of a respective spatial block of the video frame. Removal of the low frequencies may alternatively be effected at this point by appropriately filtering the lowest order coefficient terms as disclosed in the copending application.

When sub-band coding is effected by a block transform, sub-band coder 40 formats each frame of the applied video signal into a successive series of, for example, (8×8) pixel blocks. The pixel blocks are then applied to a block transform coder which may, for example, implement a DCT. In such systems, the pixel blocks are normally applied to the block transform coder in temporally correlated relation such that corresponding pixel blocks applied to the transform coder from successive frames represent spatially identical portions of the video image. Sub-band coder 40 generates 64 transform coefficients for each applied (8×8) pixel block, which coefficients are suitably compressed to provide an output video component having a bandwidth suitable for transmission over a standard 6 MHz television channel. Sub-band coder 40 also supplies a data signal to data processor 30 identifying the transmitted coefficients to facilitate reconstruction of the video image in a receiver. The compressed coefficients from sub-band coder 40 and an output of data processor 30 are then coupled to respective inputs of a multiplexer 50 where they are combined in a time division multiplexed format for transmission by a transmitter 60 over a 6 MHz television channel. Transmission is preferably effected by modulating a pair of quadrature carriers such that each has an effective bandwidth of about 3 MHz and each is characterized by horizontal and vertical periodicities equal to the NTSC standard. The transmitted signal is received by a receiver 70, which produces a video image representing the original 37 MHz video source image in response to the received coefficients and data signal. The image is preferably reproduced in the form of a progressively scanned signal having a vertical periodicity equal to the NTSC standard and a horizontal periodicity equal to three times the NTSC standard.

Depending on the amount of coefficient compression employed, systems of the foregoing type may introduce various block artifacts in the reproduced image. These block artifacts are reinforced by the temporally correlated structure of the pixel blocks from frame to frame. For example, referring to FIG. 2A, a portion of a reproduced image is illustrated corresponding to a diagonal edge 100 of the video source signal. The pixels on either side of diagonal edge 100 are thus of different video content, e.g. the pixels to the left of edge 100 representing a black image and the pixels to the right of edge 100 representing a white image. It will be appreciated that in the reproduced image all of the pixel blocks to the left of edge 100, excluding those through which the edge passes, will be reproduced in the same shade of black and all of the pixel blocks to the right of edge 100, excluding those through which the edge passes, will be reproduced in the same shade of white. However, the pixel blocks containing the edge will be reproduced in a shade of grey between black and white such that the reproduced edge will assume the illustrated stair-step shape 102 instead of a straight line. The reproduced edge is thereby characterized by a relatively course, low resolution structure. This course structure is reinforced in subsequent frames because of the temporally correlated nature in which the pixel blocks are processed. That is, the pixel blocks in successive frames of the signal are provided for processing from precisely corresponding spatial positions of the raster.

Figure 2B:
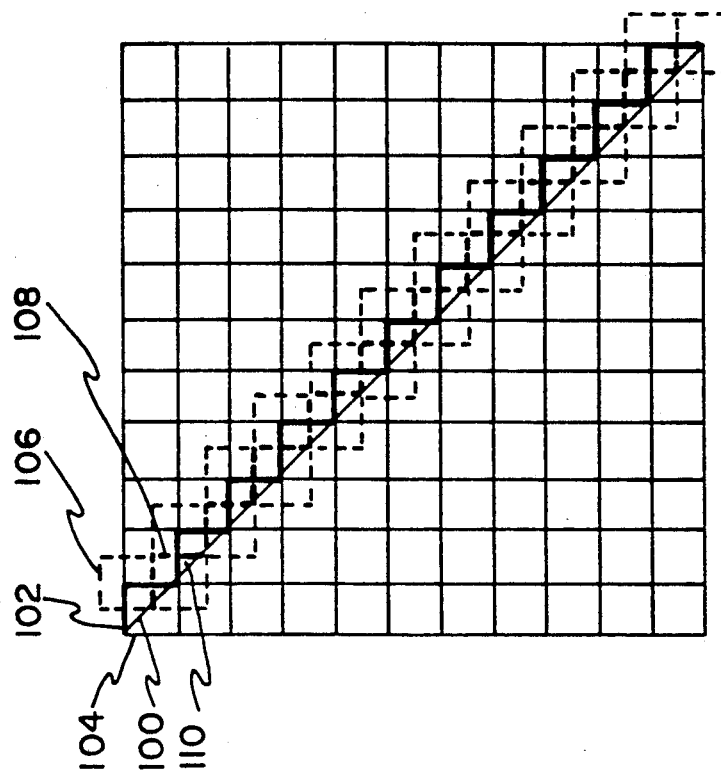
FIGS. 2A, 2B and 3 are graphical depictions of the process of temporal decorrelation of pixel blocks according to the invention
Figure 2A:
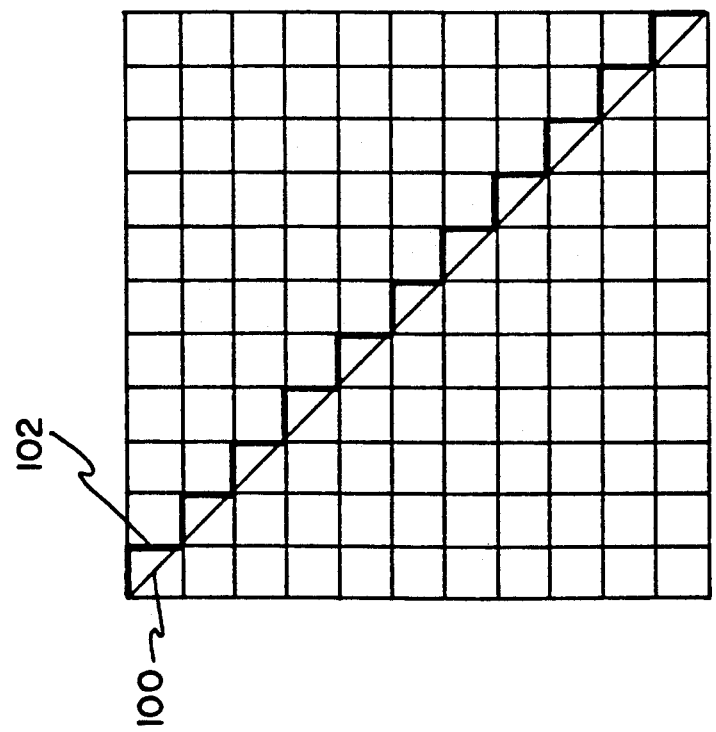

According to the present invention, block artifacts of the foregoing type are reduced through a process of temporal decorrelation. In particular, temporal decorrelation is achieved in one embodiment of the invention by offsetting the spatial structure of the pixel blocks in the transmitter and receiver from frame to frame in a selected manner. For example, the arrangement of pixel blocks may alternate in successive frames between the arrangement shown in FIG. 2A in a first frame and an alternate arrangement in a second subsequent frame in which the center of each pixel block is offset to a position corresponding to a corner, e.g. the upper right-hand corner, of the corresponding pixel block in the previous frame. The effect on diagonal edge 100 of temporally decorrelating the pixel blocks in this manner is illustrated in FIG. 2B. Solid lines are used in this Figure to represent the block structure of the reproduced image during the first frame and dashed lines the offset block structure of the reproduced image during the subsequent frame. Thus, for each pixel block reconstructed during the first frame (e.g. block 104) there is a corresponding offset block (e.g. block 106) reconstructed during the next subsequent frame.

With further reference to FIG. 2B, it will be seen that the effect of temporally decorrelating the pixel blocks as described above is that the diagonal edge 100 is reproduced in successive frames by two offset and overlapping stair-step waveforms 102 and 108. These two waveforms will be integrated by the eye of the viewer such that the reproduced edge will be perceived as having a much finer structure and thereby improved resolution. In addition, in the overlapping portions of the two waveforms, i.e. portions 110, errors in successive frames will tend to cancel thereby further improving the resolution of the reproduced edge.

Figure 3:
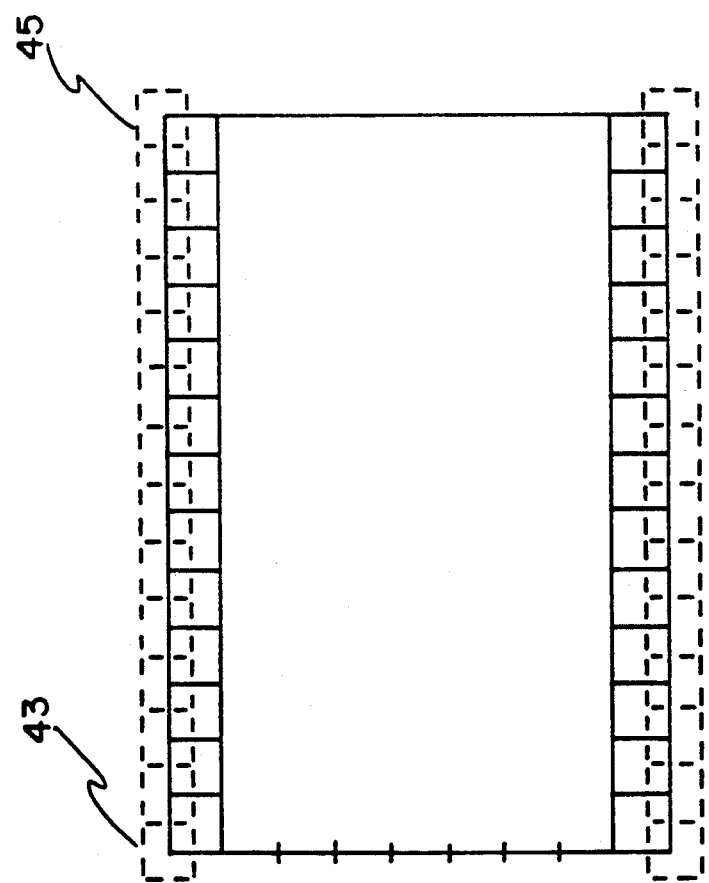
Figure 4:
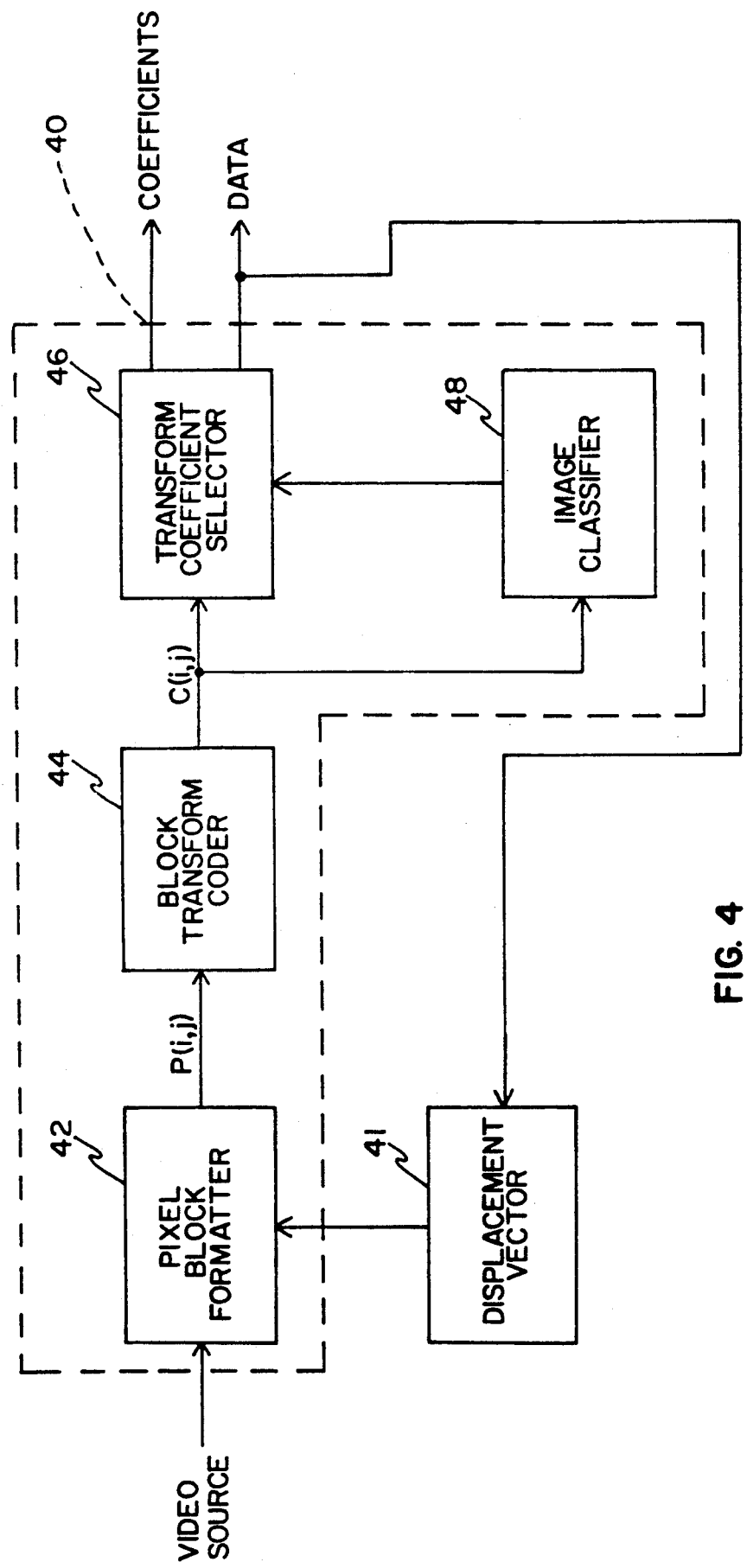
FIG. 4 is a block diagram showing a system for implementing temporal decorrelation of pixel blocks according to the invention.

A technique for implementing the system of the invention is illustrated in FIGS. 3 and 4. FIG. 3 depicts the desired arrangement of pixel blocks in two successive frames, the blocks being shown as solid lines for the first frame and as dashed lines for the offset second frame. It will be understood that this pattern repeats continuously with all odd number frames having the same arrangement of pixel blocks as frame one and all even number frames having the same arrangement as frame two. As shown in the Figure, in order to encompass the entire image represented by the odd-number frames (shown in solid line) the offset even-number frames include one extra block of pixels for each group of eight horizontal lines and one extra row of pixel blocks for each frame.

Referring now to FIG. 4, adaptive sub-band coder 40 comprises a pixel block formatter 42, a block transform coder 44, an image classifier 48 and a transform coefficient selector 46. The operation of unit 40 is described in detail in the previously referenced copending application. It is sufficient to understand for purposes of the present invention that pixel block formatter 42 accepts an input video signal and provides an output comprising a successive series of (8×8) pixel blocks P (i,j) which are transformed into a corresponding series of 64 transform coefficients C (i,j) by transform coder 44 which may, for example, implement a DCT. The coefficients C(i,j) are quantized or truncated for transmission in coefficient selector 46 in response to an image classification signal supplied by image classifier 48. A data signal is also provided at the output of selector unit 46 identifying the non-truncated coefficients.

In accordance with the present invention a displacement vector unit 41 supplies a block displacement signal to pixel block formatter 42 to effect spatial displacement of the pixel blocks from frame to frame. Displacement vector unit 41 also generates a data signal representing the state of pixel block displacement and applies the signal to the data channel. Block displacement may be of the type which repeats every two frames as illustrated in FIG. 3 or may comprise a sequence which repeats over a larger number of frames.

As indicated previously, when implementing the block decoralation pattern represented in FIG. 3, an extra pixel block is generated for each group of eight horizontal scanning lines during each even numbered frame. While the extra pixel blocks could be simply ignored, it is preferred that they be processed so that the benefits of the invention extend throughout the entire image area. However, if processed by transform coder 44 in a straight forward manner, the additional pixel blocks would result in the generation of addition transform coefficients for transmission. Thus, either the degree of compression of the remaining coefficients would have to be increased to accommodate the extra coefficients or the bandwidth of the transmission channel would have to be increased. Neither of these two alternatives are desirable.

According to a further aspect of the present invention, the useful video information represented by the extra pixel blocks is transmitted without generating any additional transform coefficients. In particular, referring for example to pixel block 43 (see FIG. 3), it will be appreciated that useful active video information is only provided by the right half of the block. Pixel block formatter 42, in response to a signal from displacement vector 41, mirror images the pixels in the right half of the pixel block into its left half such that the modified pixel block is symmetrical with respect to its vertical central axis. Pixel block 45 at the opposite end of the line of pixel blocks is similarly processed, but with its left half being mirror imaged into its right half. Since both pixel blocks 43 and 45 are symmetrical with respect to their vertical central axes, all odd coefficients generated by transform coder 44 in response to these blocks will be zero. Pixel blocks 43 and 45 together will therefore produce the same number of coefficients (all even) produced by the other non-symmetrical blocks. Thus, no additional coefficients are generated by block transform coder 44 even though an extra pixel block is processed.

Alternatively, the unprocessed pixel blocks may be directly supplied to transform coder 44 which may be modified by the inclusion of an algorithm for zeroing all of the odd coefficients generated in response to pixel blocks 43 and 45. The effect would be equivalent to that described above; i.e., no additional coefficients are generated even though an extra pixel block is processed.

The extra row of pixel blocks resulting for each even-number frame may be treated in a corresponding manner. That is, the pixels in the lower halves of each of the pixel blocks in the top row of FIG. 3 may be mirror imaged upper halves of the corresponding blocks to provide modified blocks which are symmetrical with respect to their horizontal central axes. The pixel block in the bottom row may be similarly processed, but with their upper halves being mirror imaged into their lower halves. The result is again that all odd coefficients generated by transform coder 44 in response to these blocks will be zero. Also, as before, the unprocessed pixel blocks may alternatively be directly supplied to transform coder 44 which may be modified by the inclusion of an algorithm for zeroing all of the odd coefficients generated in response to the relevant pixel blocks.

Figure 5:
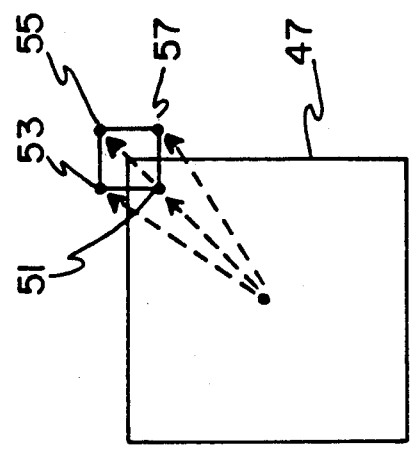
FIG. 5 is a graphical depiction of an alternate technique for temporally decorrelating pixel blocks according to the invention.

As mentioned previously, many different patterns of temporal decorrelation of the pixel blocks may be employed in accordance with the teachings of the invention. One such alternative pattern is illustrated in FIG. 5. In this case, instead of uniformly displacing the pixel blocks in the even numbered frames as shown in FIG. 3, a staggered displacement is employed as shown in FIG. 5. In this example, the spatial arrangement of pixel blocks in the even number frames repeats over a four frame sequence in which the displacement follows the pattern shown in FIG. 5. As shown in the Figure, each pixel block of a first even numbered frame is displaced (relative to block 47 of the odd frame) so that its center is located at point 51, each pixel block of the next even numbered frame so that its center is located at point 53 and the pixels blocks of the next two even numbered frames so that their centers are located at points 55 and 57 respectively. Temporal decorrelation of the pixel blocks in this manner is particularly useful for reducing artifacts caused by diagonally moving edges, and particularly those occurring at the frame rate of the signal.

Application of the present invention to sub-band coding using a quadrature mirror filter (QMF) bank is illustrated in FIG. 6. Referring to FIG. 6, the 37 MHz video source 10 provides an output stream of pixels representing successive video frames each comprising 720 lines of 1280 pixels each. The source pixels are applied to a quadrature mirror filter bank comprising 8 parallel horizontal filters F(HO)-F(H7) which separate the 37 MHz source signal into 8 substantially equal horizontal frequency bands. Each horizontal band is down-sampled (i.e. decimated) by a respective down-sampler 47 by a factor of 8 in response to a decimation clock signal $f_s$ to provide a series of 8 horizontally filtered components each comprising 720 lines of 160 pixels per frame. Each of the 8 horizontally filtered components is now applied to a respective vertical filter bank 49. Each vertical filter bank 49 comprises 8 filters F(VO)-F(V7) filtering the respective horizontal components into 8 vertical frequency bands, each of which is again down-sampled in a respective down-sampler 51 by a factor of 8 in response to decimation clock signal $f_s$. The vertical filter banks 49 thus provide 64 horizontally and vertically filtered output components each comprising 90 lines of 160 pixels per frame. Each of the output components comprises 14,400 terms/frame corresponding to a respective one of the transform coefficients derived in the transform coding implementation of the invention. For example, 14,400 (160×90) output terms representing the lowest horizontal and lowest vertical frequency bands are produced each frame. These components correspond to the 14,400 lowest order coefficient terms C(0,0) derived each frame in the transform coding implementation. That is, since each (8×8) pixel block results in a lowest order coefficient C(0,0), (1280×720/64) or 14,400 such coefficients are derived for each video frame.

Figure 7:
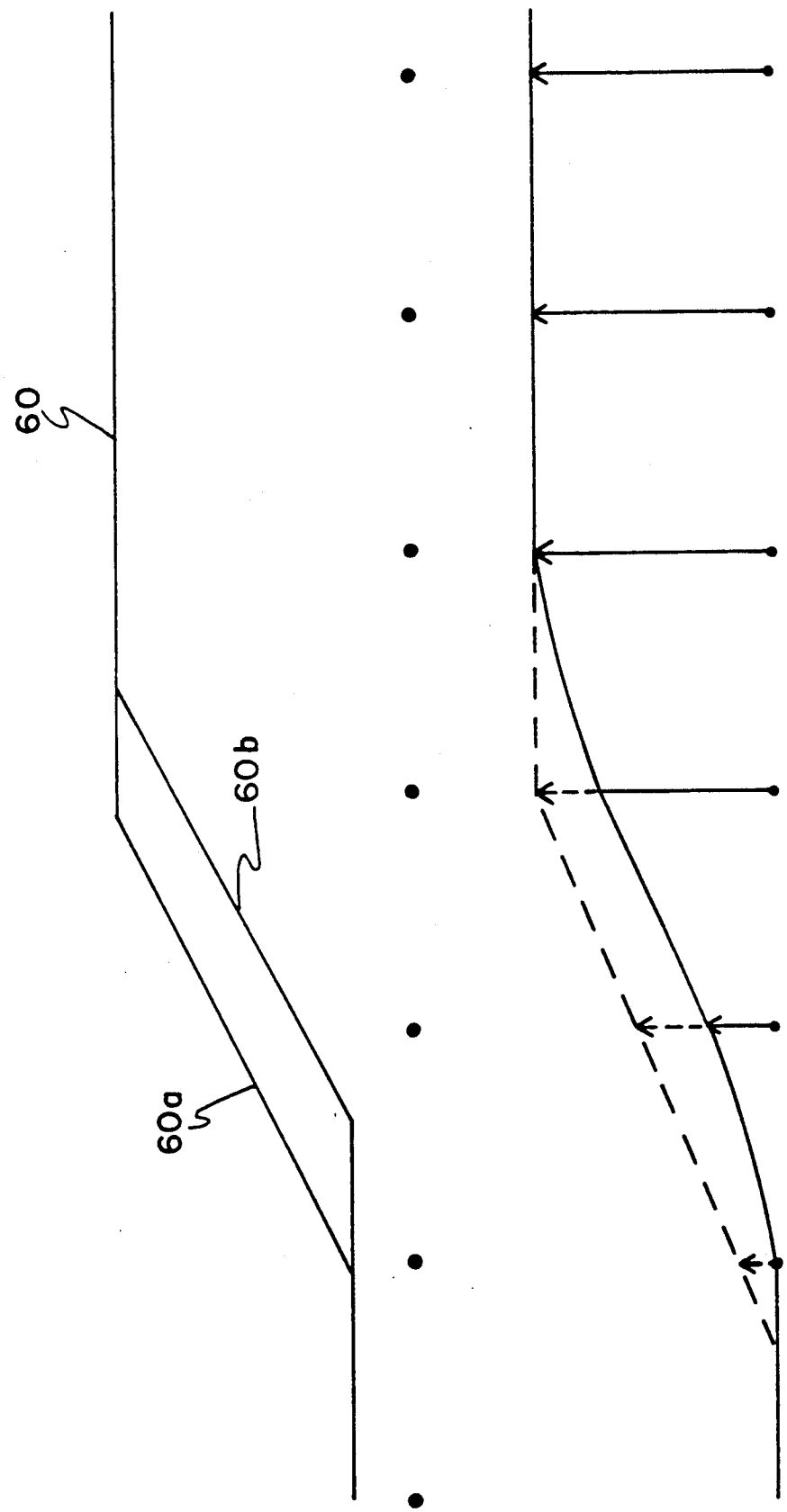
FIGS. 7 and 8 are graphical depictions useful in explaining the operation of the QMF embodiment of the invention.

Each QMF illustrated in FIG. 6 is a non-linear device comprising a linear filter followed by a decimator. When used in association with a receiver having a complementary QMF, (i.e. an interpolator for inserting zero values at non-sampled points followed by a linear filter), perfect reconstruction of the processed signal is theoretically possible. The non-linear nature of the QMF is illustrated in FIG. 7 which depicts an exemplary video input waveform 60 having two different phases represented by transitions 60a and 60b. The down-sampled representation of each phase of waveform 60 is shown below the waveform, the down-sampled representation of waveform 60 characterized by transition 60b being shown in solid line and the down-sampled representation of waveform 60 characterized by transition 60a being shown in dotted line. As shown in this Figure, the QMF clearly affects a non-linear operation since different outputs result from merely changing the phase of the input signal. This non-linear operation is the result of down-sampling the signal at different points due to the relative delay between transitions 60a and 60b.

Figure 8:
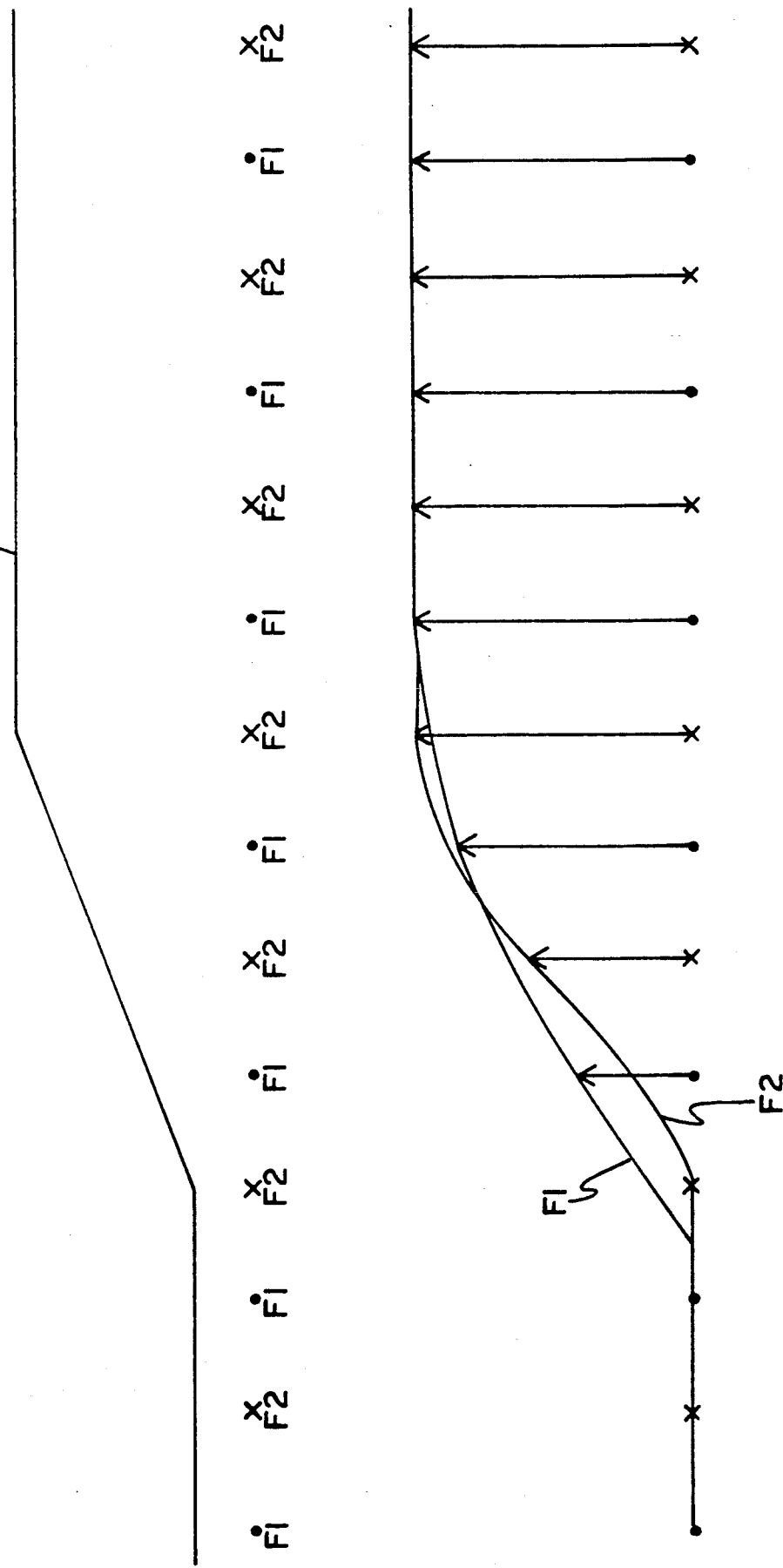

Thus, due to the non-linear nature of the QMF operation, a number of different outputs corresponding to the decimation factor (eight in the preferred embodiment of the present invention) may be provided in response to the same input waveform as its phase changes. This results in block artifacts similar to those produced when the signal is sub-band coded using a block transform as previously described. These block artifacts are reduced according to the present invention through a temporal decoralation process wherein the phase of the decimation clock is changed as a function of time. For example, the phase of the decimation clock may be offset by 180° in alternate frames as illustrated in FIG. 8. As shown in the Figure, waveform 60 is down-sampled at points identified by "dots" during frame 1 (and all subsequent odd-numbered frames) and at points identified by "X's" during frame 2 (and all subsequent even-numbered frames). The bottom waveforms illustrate the effect of changing the phase of the down-sampling point on the transition of waveform 60 from frame to frame. In particular, the waveform identified by reference designation F1 is produced during odd-numbered frames and the waveform identified by reference designation F2 is produced during even-numbered frames. As in the case of the block transform embodiment, the result of the foregoing is a slight frame-to-frame decoralation of the image providing finer detail and cancellation of overlapping errors.

The decorrelation pattern achieved from frame-to frame may be as represented in FIGS. 3 and 5. As in the transform coding implementation, the previously described mirror imaging techniques may be utilized to provide zero-value odd coefficient terms for the additional coefficient groups generated every other frame. That is, an expanded image area may be provided to the QMF bank of FIG. 6 in alternate frames, with a number of pixels corresponding to one-half the length of the QMF's being mirror imaged from the beginning and end of each video line to provide the expanded image area in the horizontal direction and with a similar number of pixels being mirror imaged from the top and bottom of the frame to provide the expanded image in the vertical direction. The additional coefficient groups will thereby be produced in alternate frames with all odd coefficients having a zero value.

The phase of the decimation clock may be conveniently controlled by a phase control unit 66 coupled to the output of the decimation clock 68 (see FIG. 6). Phase control 66 additionally provides a data signal for transmission to the receiver identifying the phase of the decimation clock signal to allow proper recovery of the filtered signal.

Figure 9:
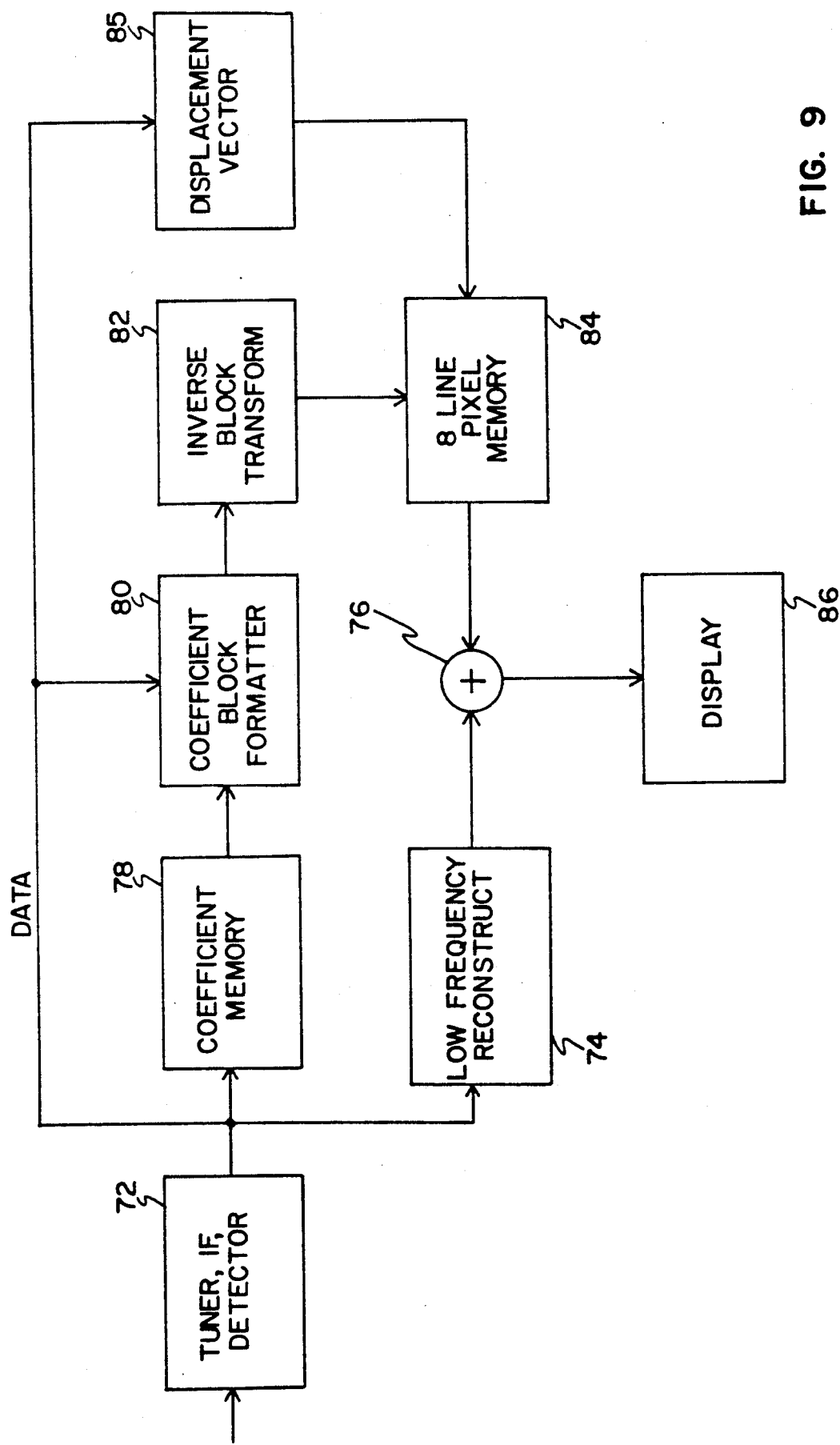
FIGS. 9 and 10 are block diagrams showing alternate embodiments of a receiver useful for practicing the invention.
Figure 10:
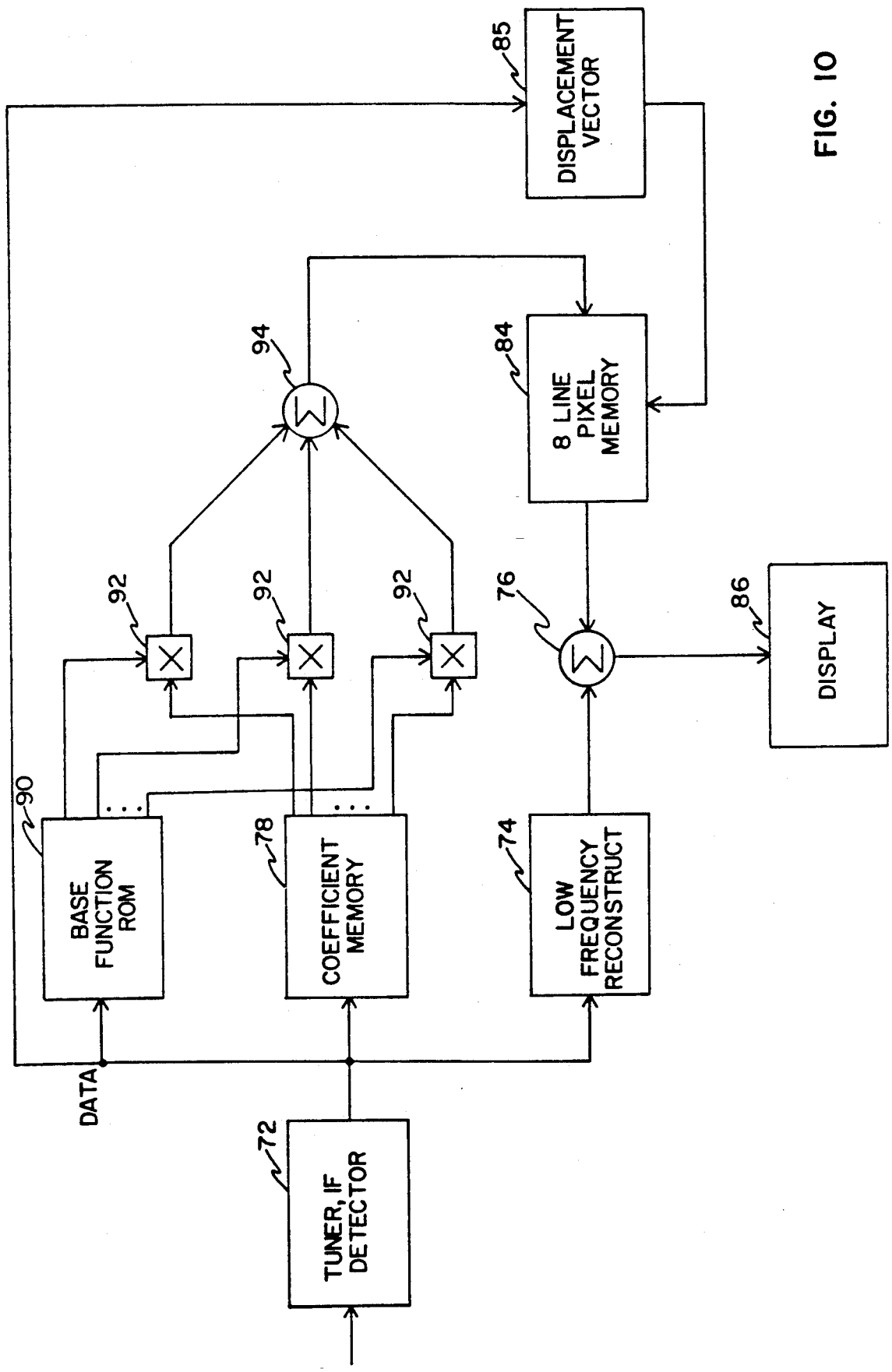

FIGS. 9 and 10 show two embodiments of receivers which may be used in accordance with the present invention. Both receivers are essentially identical to the receivers described in the copending application except that both include a displacement vector unit 85 for controlling 8-line pixel memory 84. Displacement vector unit 85 is responsive to the data signal identifying the pixel block displacement used at the transmitter for the received frame for causing pixel memory 84 to supply output pixels at a corresponding displacement.

Referring more particularly to FIG. 9, the transmitted signal including the sub-band coefficients and data, is received and demodulated by a tuner stage 72. The output of tuner 72 thus includes the digital low frequency information, the transmitted coefficients, the data signal identifying the received coefficients and the data signal identifying the pixel block displacement state. The digital low frequency information is coupled to a low frequency reconstruct circuit 74 which reconstructs the analog low frequency component of the original video source signal for application to one input of a summing circuit 76. The received coefficients are supplied to a coefficient memory 78 of sufficient size for storing 24 coefficients (the maximum number transmitted for each coefficient block). The data signal identifying the received coefficients is applied to one input of a coefficient block formatter 80, the second input of which is supplied with the received coefficients stored in memory 78. The pixel block displacement state data signal is coupled to displacement vector unit 85.

Coefficient block formatter 80, in response to the data signal and the received coefficients stored in memory 78, reconstructs a coefficient block representing the corresponding original block, with each truncated coefficient being represented by a zero value term. The reconstructed coefficients are then applied to an inverse sub-band coder 82 which provides an output comprising a representation of the corresponding 8×8 pixel block. The reconstructed pixel block is stored in an 8-line memory 84 and applied therefrom, with a displacement controlled by the output of displacement vector unit 85, to a second input of summer 76. In practice, it may be preferable to alternately read and write pixels from a pair of 8-line memories 84. Summer 76 combines the reconstructed low frequency signal from circuit 74 and the high frequency component from memory 84 to derive a composite signal which is then coupled to a display 86 for reproducing the image. The display is preferably progressively scanned and operated at a vertical rate equal to the NTSC field rate and at a horizontal rate equal to three times the NTSC horizontal rate.

FIG. 10 is a block diagram showing an alternate embodiment of the receiver of FIG. 9. Much of the circuitry in the embodiment of FIG. 10 is the same as that used in FIG. 9, the main exception being the circuit used to derive the pixels from the received coefficients and data. In the receiver of FIG. 10, a base function ROM 90 is provided for storing a plurality of base functions. Each base function stored in ROM 90 is the inverse of a respective base function used by the sub-band coder 42 in the transmitter to derive a particular coefficient. Thus, in the preferred embodiment of the invention, 64 base functions are stored in ROM 90. Each stored base function is selectively applied to the first input of one of 24 multipliers 92, 24 multipliers being provided to accommodate the maximum number of coefficients which can be transmitted for each coefficient block. Each of the 24 coefficient storage locations of coefficient memory 78 is coupled to a second input of a respective one of the multipliers 92.

The received data signal controls base function ROM 90 such that corresponding stored base functions and coefficients are supplied to respective multipliers 92. The multipliers 92 thereby perform the appropriate inverse transformation for each received coefficient for producing a plurality of outputs which, when combined in a summer 94, provide a representation of the high frequency video component. The output of summer 94 is written into 8-line pixel memory 84 which is read under the control of displacement vector unit 85 as in the embodiment of FIG. 9. Also, as in the embodiment of FIG. 9, the high frequency video component developed at the output of memory 84 is combined with the low frequency video component in summer 76 to provide a composite signal for driving display 86.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A method of processing a video signal comprising the steps of:
providing a video signal comprising a successive series of frames;
formatting each frame of said video signal into a successive series of pixel blocks, the blocks of any given frame being spatially decorrelated relative to and overlapping the corresponding pixel blocks of the immediately preceding or the immediately following frame; and
transform coding each pixel block to derive a plurality of spectral coefficients representative thereof.

2. The method of claim 1 wherein said formatting step is effected such that the center of each of said pixel blocks of a given frame is spatially offset to a position corresponding to a corner of the corresponding pixel block of the immediately preceding or immediately following frame.

3. The method of claim 1 wherein said formatting step is effected such that each of said pixel blocks of a given frame is spatially offset to a selected position on a locus surrounding a corner of the corresponding pixel block of the immediately preceding or immediately following frame.

4. The method of claim 3 wherein said formatting step is effected such that the selected position on said locus is changed during alternate frames according to a predetermined repeating sequence.

5. The method of claim 1 wherein said formatting step results in providing, for each group of a predetermined number of successive horizontal lines of said video signal, n and (n+1) pixel blocks in alternate frames.

6. The method of claim 5 wherein said transform coding step comprises, for each of said frames resulting in said (n+1) pixel blocks, setting to zero the odd coefficients of each of the coefficient groups derived in response to a pixel block located at either end of each of said groups of horizontal lines.

7. The method of claim 5 wherein said formatting step comprises, for each of said frames resulting in said (n+1) pixel blocks, mapping the pixels from the inner half to the outer half of the pixel blocks located at either end of each of said groups of horizontal lines.

8. The method of claim 1 wherein said formatting step results in providing p and (p+1) rows of pixel blocks in alternate frames of said video signal.

9. The method of claim 8 wherein said transform coding step comprises, for each of said frames resulting in said (p+1) rows of pixel blocks, setting to zero the odd coefficients of each of the coefficient groups derived in response to a pixel block located in the top and bottom rows of pixel blocks of the respective frame.

10. The method of claim 8 wherein said formatting step comprises, for each of said frames resulting in said (p+1) rows of pixel blocks, mapping the pixels from the inner half to the outer half of the pixel blocks located in the top and bottom rows of pixel blocks of the respective frame.

11. A method of processing a video signal comprising the steps of:
providing a video signal comprising a successive series of frames; and
sub-band coding each frame of said video signal by performing a plurality of non-linear filtering operations to derive a plurality of groups of coefficients, each of said groups of coefficients comprising a spectral representation of the video content of a respective portion of the frame, each of said non-linear filtering operations including a down-sampling step characterized by a phase which changes from frame to frame such that corresponding groups of said coefficients represent spatially decorrelated and overlapping portions of the respective video frames.

12. The method of claim 11 wherein said down-sampling step is characterized by a phase which changes by 180° from frame to frame.

13. The method of claim 11 including providing an expanded image area in alternate frames of said video signal, said expanded image area comprising a peripheral portion including a plurality of pixels horizontally and vertically mirror imaged from locations adjacent the periphery of said video signal.

14. A method of processing a video signal comprising the steps of:
providing a video signal comprising a successive series of frames;
sub-band coding each frame of said video signal for deriving a plurality of groups of coefficients, each of said groups of coefficients comprising a spectral representation of the video content of a respective portion of the frame, which portion is spatially decorrelated relative to and which spatially overlaps the corresponding portion of the immediately preceding or the immediately following frame;
transmitting said coefficients; and
receiving said transmitted coefficients and reproducing a representation of said video signal in response to said received coefficients, said reproduced signal comprising a series of successive frames, each of said reproduced frame being characterized by a plurality of portions which are spatially decorrelated relative to the corresponding portions of the immediately preceding and immediately following frames in a manner related to the spatial decorrelation effected in said sub-band coding step.

15. A method of processing a video signal comprising the steps of:
providing a video signal comprising a successive series of frames;
sub-band coding each frame of said video signal for deriving a plurality of groups of coefficients, each of said groups of coefficients comprising a spectral representation of the video content of a respective portion of the frame, which portion is spatially decorrelated relative to and which spatially overlaps the corresponding portion of the immediately preceding or the immediately following frame; and generating a data signal for each frame of said video signal identifying the manner in which said portions are spatially oriented within the respective frame.

16. The method of claim 15 including transmitting said data signal and said coefficients, receiving said transmitted data signal and coefficients, and reproducing a representation of said video signal in response to said received data signal and coefficients, said reproduced signal comprising a series of successive frames, each of said frames being characterized by a plurality of portions which are spatially decorrelated relative to the corresponding portions of the immediately preceding and immediately following frames in a manner related to the spatial decorrelation effected in said sub-band coding step.

17. A method of transmitting and receiving a video signal comprising the steps of:

providing a video signal comprising a successive series of frames;

sub-band coding each frame of said video signal for deriving a plurality of groups of coefficients, each of said groups of coefficients comprising a spectral representation of the video content of a respective portion of the frame, which portion is spatially decorrelated relative to the corresponding portion of the immediately preceding and immediately following frames;

generating a data signal for each of said frames identifying the manner in which said portions are spatially oriented within the respective frame;

transmitting said data signal and said coefficients;

receiving said transmitted data signal and coefficients; and reproducing a representation of said video signal in response to said received data signal and coefficients, said reproduced signal comprising a series of successive frames, each of said frames being characterized by a plurality of portions which are spatially decorrelated relative to the corresponding portions of the immediately preceding and following frames in a manner related to the spatial decorrelation effected in said sub-band coding step.

18. A television receiver comprising:

means for receiving a video signal comprising a plurality of sub-band coded spectral coefficients; and means responsive to said received coefficients for producing a video image signal comprising a successive series of frames, each of said frames being characterized by a plurality of portions which are spatially decorrelated relative to the corresponding portions of the immediately preceding and immediately following frames.

19. The receiver of claim 18 wherein each of said portions of a given frame spatially overlaps the corresponding portion of the immediately preceding or immediately following frame.

20. The receiver of claim 19 wherein said received video signal includes a data signal and wherein said means for producing is responsive to said received data signal for producing said video image signal.

* * * * *